(12) United States Patent
Demetriades et al.

(10) Patent No.: US 8,330,301 B2
(45) Date of Patent: Dec. 11, 2012

(54) POWER APPARATUS FOR A HIGH VOLTAGE ELECTRICAL POWER SYSTEM

(75) Inventors: Georgios Demetriades, Västerås (SE); Falah Hosini, Vasteras (SE); Bertil Nygren, Vasteras (SE); Jan R. Svensson, Vasteras (SE)

(73) Assignee: ABB Research Ltd. (CH)

( * ) Notice: Subject to any disclaimer, the term of this patent is extended or adjusted under 35 U.S.C. 154(b) by 0 days.

(21) Appl. No.: 12/969,273

(22) Filed: Dec. 15, 2010

(65) Prior Publication Data
US 2011/0140530 A1     Jun. 16, 2011

Related U.S. Application Data

(63) Continuation of application No. PCT/EP2008/057636, filed on Jun. 17, 2008.

(51) Int. Cl.
*H02H 7/00*  (2006.01)
(52) U.S. Cl. ........................................ 307/150
(58) Field of Classification Search ................. 307/150
See application file for complete search history.

(56) References Cited

U.S. PATENT DOCUMENTS

| | | | |
|---|---|---|---|
| 2,887,647 A | 5/1959 | Strozier | |
| 3,671,749 A * | 6/1972 | Harnden, Jr. | 250/552 |
| 5,146,100 A * | 9/1992 | Banaska | 250/551 |
| 5,744,936 A | 4/1998 | Kawakami | |
| 5,798,916 A | 8/1998 | Stacey et al. | |
| 2008/0157718 A1* | 7/2008 | Ohnuki | 320/134 |
| 2009/0179650 A1* | 7/2009 | Omagari | 324/433 |
| 2010/0097031 A1* | 4/2010 | King et al. | 320/109 |

FOREIGN PATENT DOCUMENTS

| EP | 1156573 A2 | 11/2001 |
|---|---|---|
| WO | 2008002223 A1 | 1/2008 |

OTHER PUBLICATIONS

International Preliminary Report on Patentability; PCT/EP2008/057636; Nov. 22, 2010; 9 pages.
International Search Report and Written Opinion of the International Searching Authority; PCT/EP2008/057636; Apr. 1, 2009; 12 pages.

* cited by examiner

*Primary Examiner* — Robert L. Deberadinis
(74) *Attorney, Agent, or Firm* — St. Onge Steward Johnston & Reens LLC

(57) ABSTRACT

A power apparatus for a high voltage electrical power system, that includes a voltage source converter and a high voltage dc power source including one or more strings having a plurality of dc power source members connected in series, and switches configured to connect and disconnect the strings, where the switches are solid-state switches, each string is subdivided into a plurality of dc power source units each dc power source unit including a plurality of dc power source members connected in series and each dc power source unit is provided with one of the solid-state switches configured to connect and disconnect the dc power source unit, and that all solid-state switches in the string are arranged so that they are turned on and off simultaneously.

12 Claims, 3 Drawing Sheets

US 8,330,301 B2

POWER APPARATUS FOR A HIGH VOLTAGE ELECTRICAL POWER SYSTEM

CROSS-REFERENCE TO RELATED APPLICATIONS

The present application is a continuation of pending International patent application PCT/EP2008/057636 filed on Jun. 17, 2008, which designates the United States and the content of which is incorporated herein by reference.

FIELD OF THE INVENTION

The present invention relates to a power apparatus for a high voltage electrical power system, the power apparatus comprising a voltage source converter and a high voltage dc power source comprising one or more strings including a plurality of dc power source members connected in series, and switches configured to connect and disconnect the strings. By a high voltage electrical power system should be understood an electrical system within the range of 3 kV and upwards, preferably in the range of 10 kV and upwards. By a high voltage dc power source should be understood dc power source members connected in series to be within the range of 3 kV and upwards. With a power apparatus is meant an apparatus that is capable of controlling reactive power and/or active power. Examples of power apparatus are a power compensator and an uninterruptible power supply (UPS). High voltage electrical power systems can be networks for transmission or distribution of electrical energy as well as industries, hospitals and such.

BACKGROUND OF THE INVENTION

A power compensator is used to control reactive power of a high voltage electrical power system. The power compensator is able to produce as well as absorb reactive power. The power compensator comprises a voltage source converter (VSC) with a dc side and an ac side. The ac side of the voltage source converter is connected to the high voltage electrical power system. To be capable to control the reactive power, the dc side of the voltage source converter is provided with a dc power source.

Today the dc power source is a high voltage battery. Since the power apparatus is connected to the ac voltage of the electrical high power system, a plurality of battery cells have to be connected in series to match the dc voltage of the power apparatus. Moreover, to obtain the desired active power and duration of the energy storage, a number of strings including a plurality of battery cells must be connected in parallel.

Furthermore, in case of a fault, such as a short-circuit, the power apparatus has to be protected. Consequently, two switches are provided in each string to disconnect the string in case the converter, a string, or a part of the string is short-circuited. One switch is able to disconnect the string from the positive dc rail of the converter and the other switch is able to disconnect the string from the negative dc rail of the converter. Each of the switches has to be rated for the entire converter voltage to be capable of protecting the power apparatus.

Up to now, mechanical dc circuit breakers have been used as switches for connection and disconnection of the strings. However, the availability of dc circuit breakers is limited and the ratings of these breakers are considerably low and less than the required voltage ratings in high voltage electrical power systems. To overcome this problem mechanical ac circuit breakers with some additional circuitry, such as a resonance circuit connected in parallel with the ac circuit breaker, have been used. The additional circuitry makes the mechanical ac circuit breakers less robust, expensive and space requiring as well as being extremely sensitive to circuit parameters.

A solid-state switch is an electronic switch that, unlike a mechanical breaker, contains no moving parts. There is a desire on the market to be able to exchange the mechanical ac circuit breakers with solid-state switches. However, solid-state switches with a voltage rating high enough to replace the mechanical ac circuit breakers of the power apparatus for connecting and disconnecting the strings of a power apparatus for a high voltage electrical power system are not available on the market.

SUMMARY OF THE INVENTION

An object of the invention is to provide a power apparatus, which makes it possible to replace the mechanical switches with solid-state switches in an advantageous manner.

This object is achieved according to the invention by a power apparatus characterized by the features in the independent claim 1.

A power apparatus according to the invention is characterized in that each string is subdivided into a plurality of dc power source units, each including a plurality of dc power source members connected in series, and each dc power source unit is provided with one solid-state switch configured to connect and disconnect the dc power source unit, and all switches in the string are arranged so that they are turned on and off simultaneously.

With a dc power source member is meant a small entity capable of providing dc power, such as a battery cell, a photovoltaic cell, a fuel cell, or a super capacitor. Different types of dc power source members could also be combined in the power apparatus.

By subdivision of a string into a plurality of dc power source units, distributing a plurality of dc power source units along the string, and providing each of the dc power source units with a solid-state switch, it is possible to reduce the voltage level that each of the solid-state switches has to switch off, and accordingly it is possible to use solid-state switches available on the market. The string is divided in such a way that the voltage over each dc power source unit is adapted to the breaking capability of the switch. By this feature is possible to reduce the number of switches to half the number of switches compared to a solution in which the prior art mechanical dc circuit breakers, which are placed next to the positive and negative dc rail, respectively, are replaced by solid-state switches.

By the use of solid-state switches the power apparatus have less space requiring switches of low complexity, which is less sensitive to circuit parameters and which operation is more reliable and robust.

All switches in the string are arranged so that they are turned on and off simultaneously, implying that each switch only has to withstand the voltage over its corresponding dc power source unit when the string is disconnected. This embodiment eliminates the risk for causing over voltages due to some switches turn off earlier than other in the string.

Another advantage achieved by the power apparatus according to the invention is that by subdividing the string into a plurality of dc power source units and providing each of the dc power source units with a solid-state switch configured to connect and disconnect the dc power source unit, it is possible to turn off and protect the power apparatus from short-circuit currents in cases where protection was impossible using prior art solutions. The invention makes it possible to turn off short-circuit currents occurring internally in the string, within the series-connection of dc power source members, thereby avoiding that the dc power source member are damaged due to overheating resulting from the internal short circuit. With a power apparatus according to the invention, each switch is arranged to disconnect a less number of dc power source members compared to the prior art, in which the switches are arranged to disconnect a whole string. Thus, the possibilities to protect the power apparatus from short-circuits have been considerably increased and the internal short-circuits still occurring within a dc power source unit will be less damaging.

The solid-state switch is, for example, an Insulated-Gate Bipolar Transistor (IGBT).

In accordance with an embodiment of the invention, the dc power source members are battery cells. By using battery cells as dc power source members it is possible to charge the high voltage dc power source with energy at occasions when there is excessive power available in the high voltage electrical power system, to be used at other occasions when there is a deficit of power in the system.

In accordance with an embodiment of the invention, each switch comprises a rectifying member connected in anti-parallel with a controllable semiconductor. Charging the dc power source members with excessive power from the high voltage electrical power system is thereby possible.

In accordance with an embodiment of the invention, the switch is arranged to be bidirectional. With bidirectional switches it is possible to control not only the current from the dc power source to the converter, but also the current in the opposite direction.

In accordance with an embodiment of the invention, each of the dc power source units is arranged to supply the switch with power. By feeding the switch with power from the dc power source units no additional circuitry has to be arranged to supply power to the switches. Moreover, as the switch and the negative side of the dc power source unit have the same electrical potential, the problems with galvanic isolation are less, leading to a simpler and cheaper solution.

In accordance with an embodiment of the invention, the dc power source unit has a positive and a negative side, the switch comprises a transistor having a collector, an emitter and a gate, and the emitter of the transistor is connected to the negative side of the dc power source unit. By varying the voltage between the gate and emitter, the resistance between collector and emitter can be controlled and, thus, the current through the transistor at a certain voltage can be determined. To turn on the transistor the voltage between the gate and emitter is set to approximately 15 V. If the voltage decreases, the current through the transistor will decrease and at some gate-emitter voltages, approximately 5 V, the transistor has turned off the current through the dc power source unit completely. By connecting the emitter of the transistor to the negative side of the dc power source unit, the additional circuitry to connect the positive side of the dc power source unit to the gate can be very simple and the problems with galvanic isolation are eliminated.

In accordance with an embodiment of the invention, each of the switches is arranged to measure the voltage over the controllable semiconductor, and each string is provided with a string control unit configured to control the switches of the string and to instruct the switches to disconnect the dc power source units of the string upon detecting that the voltage over any of the semiconductors of the string is above a threshold value. The string control unit controls all the switches in the string and determines when to turn on and turn off, respectively, each of the switches. If a switch detects that the voltage over its corresponding controllable semiconductor is above a threshold value, a signal is sent to the string control unit, which instructs all the switches in the string to disconnect the dc power source units of the string. Disconnecting all the dc power source units of the string upon detecting that the voltage over any of the semiconductors of the string is above a threshold value secures a fast disconnection of the failed string. Otherwise the increased current could harm the other dc power source units in the same or in other strings with the risk to damage the whole power apparatus.

In accordance with an embodiment of the invention, each of the switches is arranged to measure the voltage over the controllable semiconductor, each string is provided with a current measuring device arranged to measure the current through the string, and the power apparatus comprises a main controller configured to receive current measuring values from the current measuring devices and to receive information on which of the semiconductors in the dc power source have a voltage above the threshold value and to locate failing dc power source units based on the received measured current values and the received information on which of the semiconductors in the dc power source have a voltage above the threshold value. The main controller is connected to each of the string control units in the dc power source and is capable of exchanging information with the string control units. If a switch detects that the voltage over its corresponding controllable semiconductor is above a threshold value, a signal is sent to the string control unit, which instructs all the switches in the string to disconnect the dc power source units of the string. The signal also contains information on which of the semiconductors in the dc power source have voltages above the threshold value. This information in combination with the current measuring values is used to locate the failed dc power source unit or units. When a failed dc power source unit is located it is possible to replace the failed unit. Since the amount of dc power source units can be very high, it is a great advantage to be able to locate failed dc power source units.

In accordance with an embodiment of the invention, the switch is of current limiting type. Identifying a short-circuit current through a dc power source unit by measuring the voltage over the controllable semiconductor is thereby possible.

Another object of the invention is to provide a method for control and supervise of the power apparatus according to the invention.

Such a method comprises the following steps:
measuring the voltage over the controllable semiconductors, detecting whether the voltage over any of the semiconductors of one of the strings is above a threshold value, and
instructing the switches to disconnect the dc power source units of the string upon detecting that the voltage over any of the semiconductors of the string is above a threshold value.

This method makes it possible to detect faults in each of the dc power units by measuring the voltage over the controllable semiconductors of the solid-state switch, and upon detecting a fault disconnect the entire string.

In accordance with an embodiment of the invention the method comprises the following steps:
measuring the voltage over the controllable semiconductors,
detecting whether the voltage over any of the semiconductors of one of the strings is above a threshold value,
instructing the switches to disconnect the dc power source units of the string upon detecting that the voltage over any of the semiconductors of the string is above a threshold value,
measuring the current through each of the strings, and locating failing dc power source units based on the received measured current values and on which of the semiconductors in the dc power source have a voltage above the threshold value. This embodiment makes it possible to locate the failed dc power source unit or units, and accordingly to replace the failed unit.

DETAILED DESCRIPTION OF THE INVENTION

Figure 1:
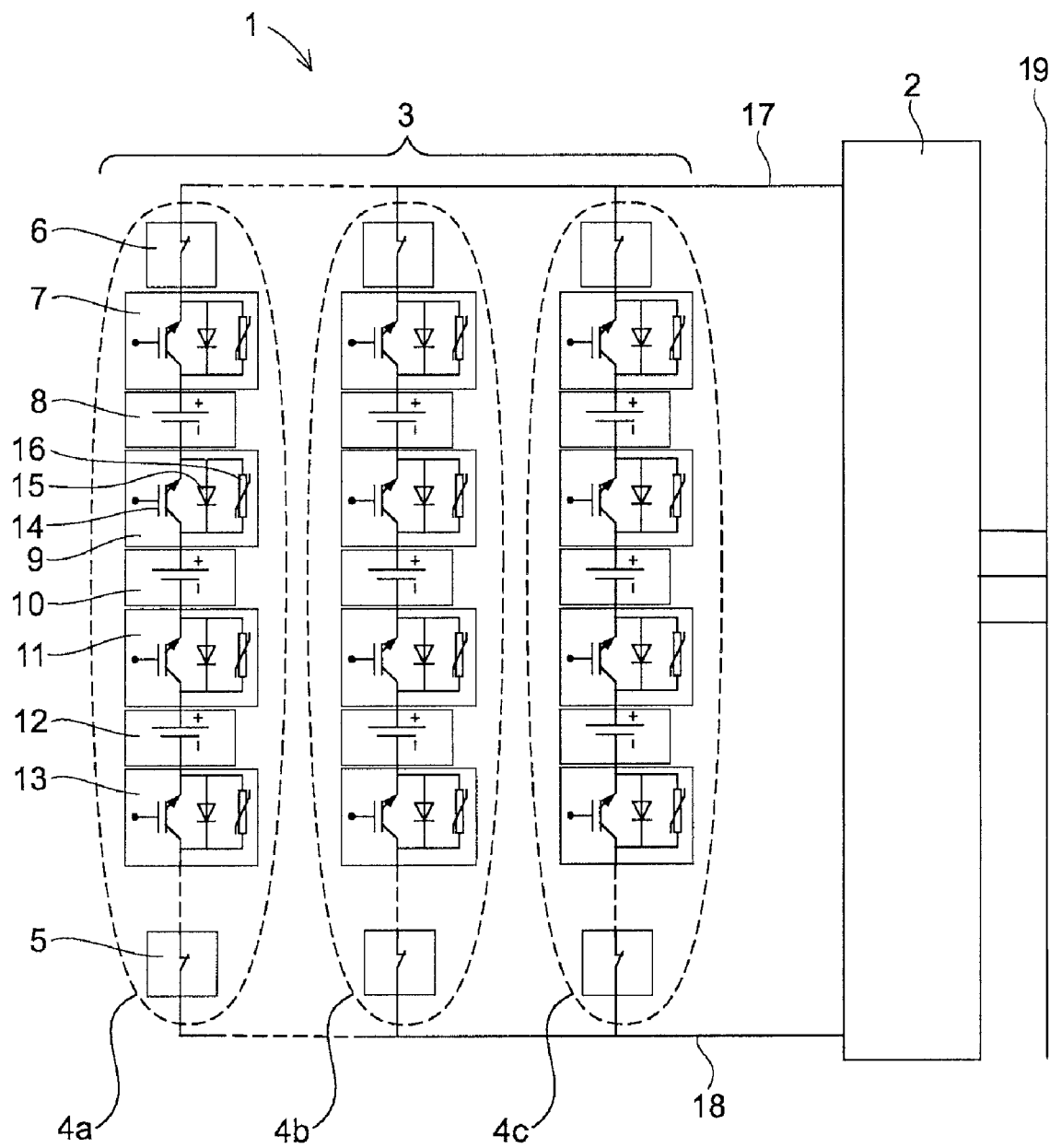
FIG. 1 is an embodiment of a power apparatus in accordance with the present invention.

FIG. 1 shows a power apparatus 1 for a high voltage electrical power system 19 according to an embodiment of the invention. The same reference numerals are used throughout the figures for same or corresponding parts. The power apparatus comprises a high voltage dc power source 3, in the following denoted dc power source 3. To be able to produce and absorb not only reactive power but also active power, the dc power source 3 is connected to the dc side of a voltage source converter 2, in the following denoted a converter 2. The ac side of the converter is connected to the high voltage electrical power system 19.

The dc power source 3 comprises one or more strings connected in parallel, depending on the desired amount of active power. In the example illustrated in FIG. 1, three strings are shown 4a, 4b, 4c. Each string 4a, 4b, 4c comprises a plurality of dc power source members 8, 10, 12 connected in series. The number of dc power source members in series connection depends on the voltage level of the voltage source converter 2 to which they are connected and the voltage level of the dc power source members used in the string 4a, 4b, 4c. The dc power source members can be of different types, such as battery cells, photovoltaic cells, fuel cells and super capacitors. These different types could also be combined.

Each string 4a, 4b, 4c is subdivided into a plurality of dc power source units. In the example illustrated in FIG. 1, three dc power source units 8, 10, 12 are shown, including a plurality of dc power source members not shown in FIG. 1. Each dc power source unit 8, 10, 12 is provided with a solid-state switch 9, 11, 13, in the following denoted a switch. The switches 9, 11, 13 are configured to connect and disconnect the corresponding dc power source units 8, 10, 12. All switches 9, 11, 13 in the string are arranged so that they are turned on and off simultaneously, implying that each switch 9, 11, 13 only has to withstand the voltage over its corresponding dc power source unit 8, 10, 12 when the string 4a, 4b, 4c is disconnected. The voltage of the dc power source units 8, 10, 12 is adapted to the breaking capability of the switch 9, 11, 13. However, the switches 9, 11, 13 tend not to build up voltage completely synchronously. Certain switches 9, 11, 13 tend to turn off earlier than others, which easily causes over voltages to arise for those switches 9, 11, 13 which turn off early in each string 4a, 4b, 4c. This problem is, for example, solved by means of an overvoltage device at each switch 9, 11, 13 in accordance with U.S. Pat. No. 5,946,178 to Bijlenga, limiting a too high voltage growth across individual switches 9, 11, 13.

It is necessary to disconnect the strings 4a, 4b, 4c from the converter 2 prior to service and maintenance on the dc power source 3 or on the converter 2, as well as during faults. However, a short-circuit current occurring internally, inside the dc power source units 8, 10, 12, may occur. Due to the fact that the switches 9, 11, 13 are distributed along the string 4a, 4b, 4c, the risk of internal short-circuits will be decreased and the internal short-circuits still occurring within a dc power source unit 8, 10, 12 will give lower short-circuit currents since the number of series-connected dc power source members will be lower.

In case of a short-circuit between the negative side of the dc power source unit 8 closest to positive dc rail 17 and the dc rail 17 itself, a switch 7 is necessary in the path of the short-circuit current to be able to disconnect the dc power source unit 8. Thus, an extra switch 7 has been connected to the positive side of the dc power source unit 8, as shown in FIG. 1.

Disconnectors 5, 6 are placed in the strings next to the positive dc rail 17 and in the strings next to the negative dc rail 18. The disconnectors 5, 6 can be advantageous for security reasons during labour on the dc power source 3 or on the converter 2. It would also be possible to distribute a plurality of smaller disconnectors along each string analogously to the distribution of the switches 7, 9, 11, 13.

Each switch 7, 9, 11, 13 comprises a controllable semiconductor, in this embodiment a transistor 14, and a rectifying member, in this embodiment a diode 15, which is connected in anti-parallel with the transistor 14, which makes it possible to charge the dc power source units 8, 10, 12 with power from the high voltage electrical power system 19 whenever excessive power is available.

Each of the dc power source units 8, 10, 12 are arranged so that they supply the corresponding switch 9, 11, 13 with the power necessary for turning on and turning off the switches.

Each of the dc power source unit 8, 10, 12 has a positive and a negative side. In the embodiment disclosed in FIG. 1, each switch comprises a transistor 14 having collector, an emitter and a gate.

The dc power source units and the switches are arranged in series. Each dc power source units is arranged between two neighboring switches, and the emitter of the transistor 14 is connected to the negative side of one of the dc power source unit 8, 10, 12 and the collector of the transistor 14 is connected to the positive side of another dc power source unit. By varying the voltage between the gate and emitter, the resistance between collector and emitter can be controlled and, thus, the current through the transistor 14 at a certain voltage can be determined. To turn on the transistor 14 the voltage between the gate and emitter is set to approximately 15 V. If the voltage decreases, the current through the transistor 14 will decrease and at some gate-emitter voltage, approximately 5 V, the transistor 14 has turned off the current through the dc power source unit completely. By connecting the emitter of the transistor 14 to the negative side of the dc power source unit, the additional circuitry to connect the positive side of the dc power source unit to the gate can be very simple and the problems with galvanic isolation are eliminated.

The switches 7, 9, 11, 13 can be arranged to be bidirectional. With bidirectional switches it is possible to control not only the current from the dc power source 3 to the converter 2, but also the current in the opposite direction. Connection of the converter 2 and the dc power source 3 is feasible only if their voltage levels are similar. If the converter 2 has a higher voltage level than the dc power source 3, a surge current will flow through the dc power source units 8, 10, 12. As a result, the dc power source units 8, 10, 12 are thermally stressed, implying a reduced life time. Thus, with bidirectional switches a charging of the dc power source units can be controlled.

Figure 2:
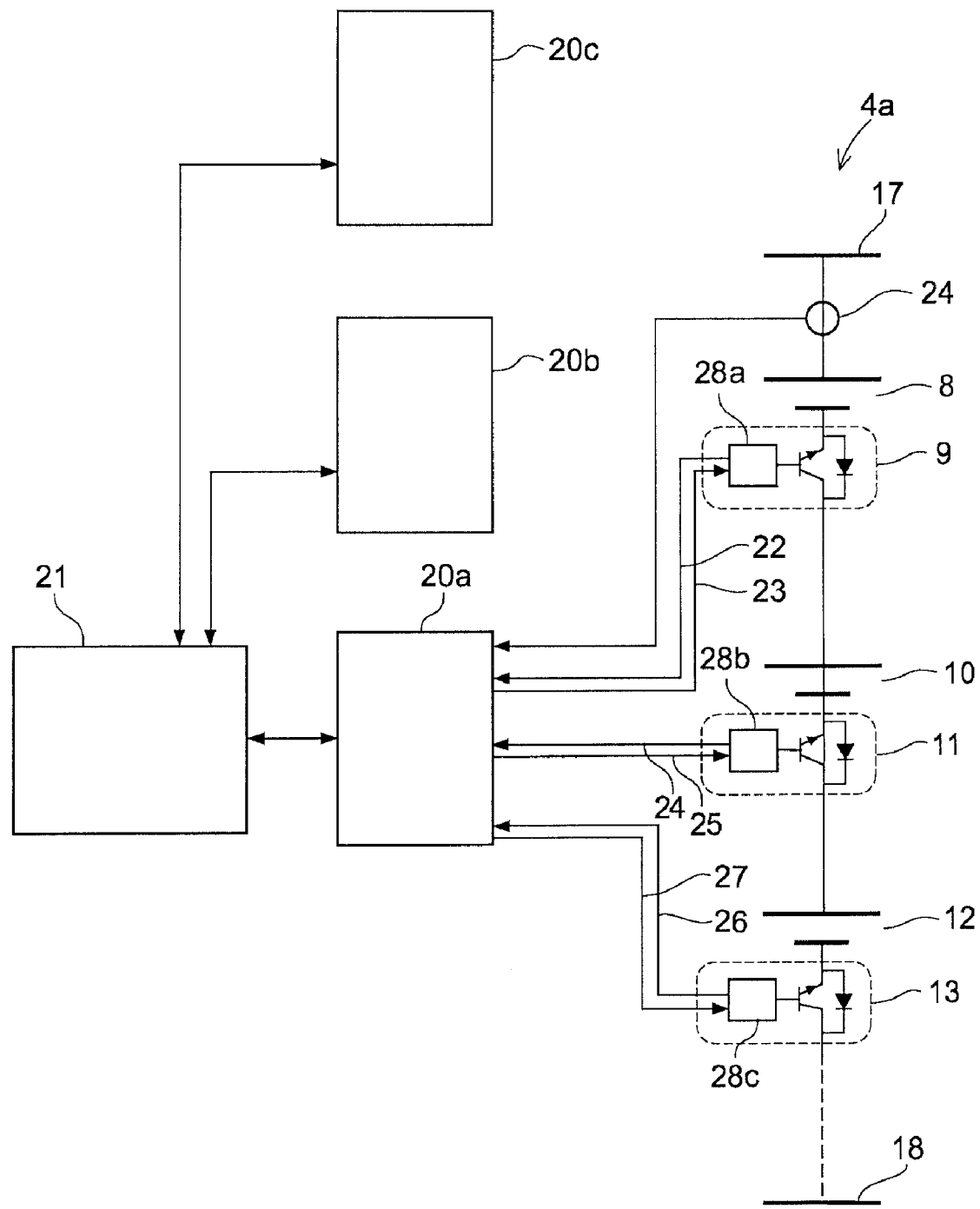
FIG. 2 is an embodiment of a control system of the power apparatus in accordance with the present invention.

FIG. 2 illustrates an embodiment of the invention where each of the switches 9, 11, 13 is arranged to measure the voltage over its controllable semiconductor. In the example illustrated in FIG. 2, only one string 4a is shown. Each string 4a, 4b, 4c is provided with a string control unit 20a, 20b, 20c configured to control the switches of its corresponding string 4a, 4b, 4c via a connection means, preferably a fiber optic cable, and instruct the switches when to turn on and turn off, respectively. In the example of FIG. 2 the string control unit 20a is configured to control the switches 9, 11, 13 of string 4a. The string control unit 20b is configured to control the switches of string 4b and the string control unit 20c is configured to control the switches of string 4c. The string control units are configured to generate signals 23, 25, 27 which simultaneously turn on and off the switches of the string.

Each of the switches in the strings comprises a gate unit 28a-c configured to detect when the voltage over the controllable semiconductor is above a threshold value, and to generate a signal 22, 24, 26 including information on when the voltage is above the threshold value. The signal 22, 24, 26 is sent via the connection means to the string control unit 20a to inform the string control unit 20a that a too high current, possibly a short-circuit failure, has been detected and the string control unit 20a will immediately instruct all the switches 9, 11, 13 in the string 4a to disconnect its corresponding dc power source units 8, 10, 12. This solution will secure a fast disconnection of the failed string 4a. Without a fast disconnection the increased current could harm other dc power source units 8, 10, 12 in the same or in other strings with the risk of damaging the whole power apparatus. Since the switch 9, 11, 13 is connected in series with its corresponding dc power source unit 8, 10, 12, the same current will path through the switch and the dc power source unit. Consequently, if the switch 9, 11, 13 is of current limiting type, a too high current through the dc power source unit 8, 10, 12 will lead to an increased voltage over the switch 9, 11, 13. The increased voltage will enable the gate unit 28a-c to generate the signal 22, 24, 26 to the string control unit 20a which will lead to a disconnection of the dc power source units 8, 10, 12.

The strings can further be provided with current measuring devices arranged to measure the current through the string. In the example shown in FIG. 2, where only one string 4a is shown, the string 4a is provided with a current measuring device 24 arranged to measure the current through the string 4a. The power apparatus may further comprise a main controller 21 configured to receive current measuring values from the string control units in the power apparatus. The main controller 21 is connected to each of the string control units 20a, 20b, 20c in the dc power source 3 via connection means, preferably fibre optic cables, and is capable of exchanging information with the string control units 20a, 20b, 20c. The main controller and the string control units include suitable processing means, such as a Central Processing Unit and memory storage for storing measuring values. The string control units receive the current measuring values from the corresponding current measuring device. In FIG. 2 the main controller 21 receives the current measuring values in string 4a from the current measuring device 24 via the string control units 20a. Additionally, the main controller 21 receives information, via the string control units 20a, 20b, 20c on which of the controllable semiconductor in the dc power source 3 has a voltage above a threshold value. The main controller 24 is configured to determine which of the dc power source units is failing based on the current measuring values from the current measuring devices and the information on which switches has a voltage above the threshold value. Accordingly, it is possible to locate a failing dc power source unit.

Figure 3:
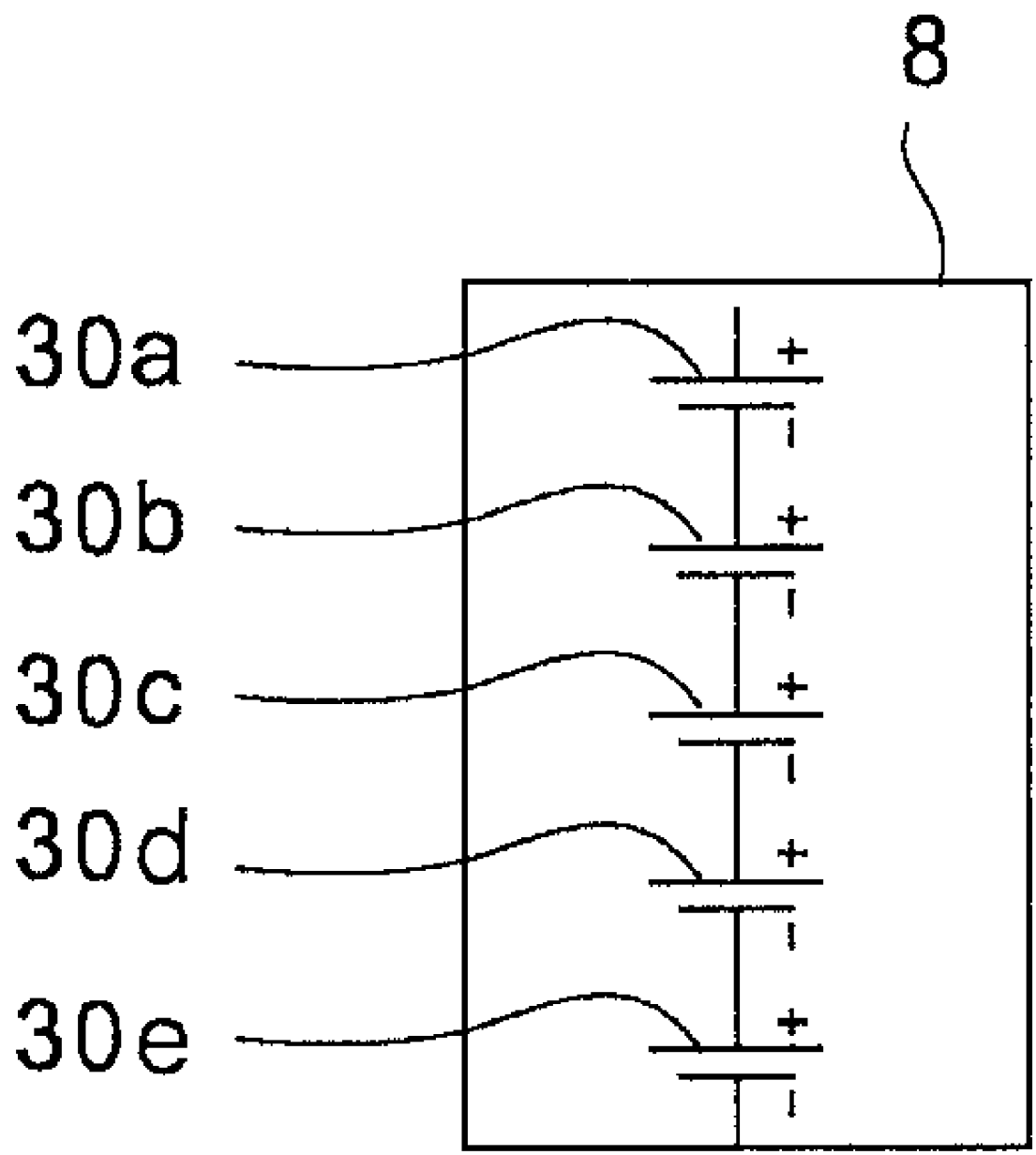
FIG. 3 is a dc power source unit comprising a plurality of dc power source members.

In FIG. 3, a more detailed illustration of the dc power source units described above, is shown. In the example shown in FIG. 3 the dc power source unit 8 is shown comprising a plurality of dc power source members 30a-e connected in series. The voltage over each dc power source unit 8, 10, 12 is adapted to the breaking capability of the switch 9, 11, 13. Consequently, the number of dc power source members is usually much higher than illustrated in this example where, for clarity reasons, only five dc power source members 30a-e are connected in series. In a typical application, the dc power source units 8, 10, 12 would consist of between five hundred and three thousand (500-3000) dc power source members 30a-e. Typically, between three and five dc power source units 8, 10, 12 are distributed in each string 4a, 4b, 4c.

What is claimed is:

1. A power apparatus for a high voltage electrical power system, the power apparatus comprising:
   a voltage source converter, and
   a high voltage dc power source comprising:
      one or more strings including a plurality of dc power source members connected in series, and
      switches configured to connect and disconnect said strings,
   wherein said switches are solid-state switches, each string is subdivided into at least three dc power source units, each dc power source unit including a plurality of dc power source members connected in series and each dc power source unit is provided with one of said solid-state switches configured to connect and disconnect the dc power source unit, and that all solid-state switches in the string are arranged so that they are turned on and off simultaneously.

2. The power apparatus according to claim 1, wherein the dc power source members are battery cells.

3. The power apparatus according to claim 1, wherein each switch comprises a controllable semiconductor.

4. The power apparatus according to claim 3, wherein each switch comprises a rectifying member which is connected in anti-parallel with the controllable semiconductor.

5. The power apparatus according to claim 3, wherein:
   each of the switches is arranged to measure the voltage over the controllable semiconductor,
   each string is provided with a string control unit configured to control the switches of the string and to instruct the switches to disconnect the dc power source units of the string upon detecting that the voltage over any of the semiconductors of the string is above a threshold value.

6. The power apparatus according to claim 3, wherein:
   each of the switches is arranged to measure the voltage over the controllable semiconductor,
   each string is provided with a current measuring device arranged to measure the current through the string,
   the power apparatus comprises a main controller configured to receive current measuring values from the current measuring devices and to receive information on which of the semiconductors in the dc power source have a voltage above the threshold value and to locate failing dc power source units based on the received measured current values and said received information on which of the semiconductors in the dc power source have a voltage above the threshold value.

7. The power apparatus according to claim 1, wherein the switch is arranged to be bidirectional.

8. The power apparatus according to claim 1, wherein each of the dc power source units is arranged to supply the switch with power.

9. The power apparatus according to claim 1, wherein the dc power source unit has a positive and a negative side, the switch comprises a transistor and that the emitter of the transistor is connected to the negative side of the dc power source unit.

10. The power apparatus according to claim 1, wherein the switch is of current limiting type.

11. A method for control and supervision of a power apparatus according to claim 3, wherein the method comprises:

measuring the voltage over the controllable semiconductors, detecting whether the voltage over any of the semiconductors of one of the strings is above a threshold value, and instructing the switches to disconnect the dc power source units of the string upon detecting that the voltage over any of the semiconductors of the string is above a threshold value.

12. The method according to claim 11, wherein the method further comprises:

measuring the current through each of the strings, and locating failing dc power source units based on the received measured current values and on which of the semiconductors in the dc power source have a voltage above the threshold value.

\* \* \* \* \*